Nov. 7, 1961     H. A. PEARSON ET AL     3,007,281
STEERING AND PROPULSION MEANS FOR MINIATURE AUTOMOBILES
Filed Dec. 21, 1959     2 Sheets-Sheet 1
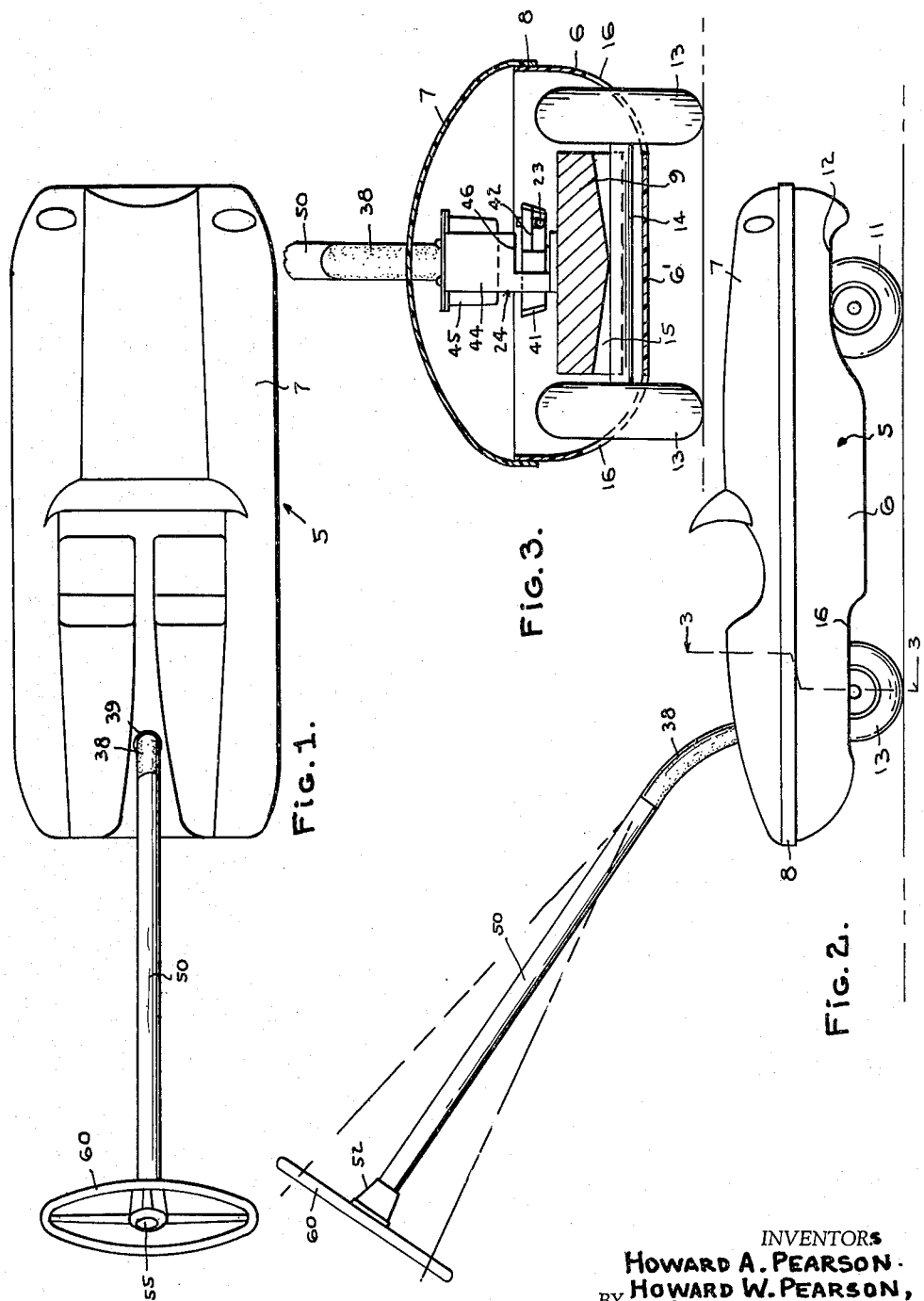
INVENTORS
HOWARD A. PEARSON
HOWARD W. PEARSON,
BY
ATTORNEY Nov. 7, 1961  H. A. PEARSON ET AL  3,007,281
STEERING AND PROPULSION MEANS FOR MINIATURE AUTOMOBILES
Filed Dec. 21, 1959  2 Sheets-Sheet 2

INVENTORS
HOWARD A. PEARSON
HOWARD W. PEARSON,
BY
*James H. Ryler*
ATTORNEY

United States Patent Office 3,007,281
Patented Nov. 7, 1961

3,007,281
STEERING AND PROPULSION MEANS FOR
MINIATURE AUTOMOBILES
Howard A. Pearson and Howard W. Pearson, both of
R.F.D. 1, Box 915, Fort Lauderdale, Fla.
Filed Dec. 21, 1959, Ser. No. 860,892
4 Claims. (Cl. 46—232)

This invention relates to toy land vehicles of the type that are supported by ground wheels and with means associated with the vehicle that projects rearwardly and is flexible upwardly to constitute a propulsion and steering unit for the vehicle and whereby the upward flexing functions to adapt the device to children of varying ages and heights.

The invention contemplates a miniature land vehicle having ground wheels and with the vehicle including a molded sectional body portion that houses steering mechanism for front wheels of the vehicle and audible signal means and with the steering mechanism being extended upwardly and rearwardly through an opening in the body to be connected to a hand wheel or the like whereby a child walking upon the ground may propel the vehicle forwardly and to also steer the vehicle in a lateral path and with means carried by the steering wheel and associated with the steering mechanism whereby an audible signal may be sounded in accordance with the wishes of the child.

The invention also contemplates a steering column and steering mechanism embodied in a land vehicle of the miniature type that has a conventional steering assembly for the front end of the vehicle, a rearwardly and upwardly extending steering column that carries a steering wheel and with the column and the steering wheel being bodily movable in a vertical plane to accommodate children of varying heights and with the steering column and a connecting drive tube to the steering mechanism being frictionally coupled so that the device will slip when a child oversteers or moves the mechanism in its maximum arc so that there will be no tendency for the vehicle to tilt or upset and there will be no tendency for the steering mechanism to become jammed or locked.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 4:
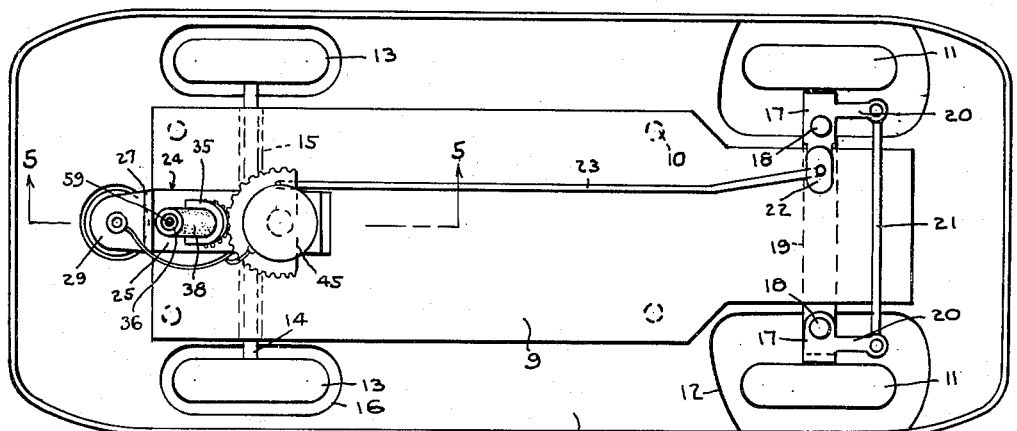
Figures 5, 6:
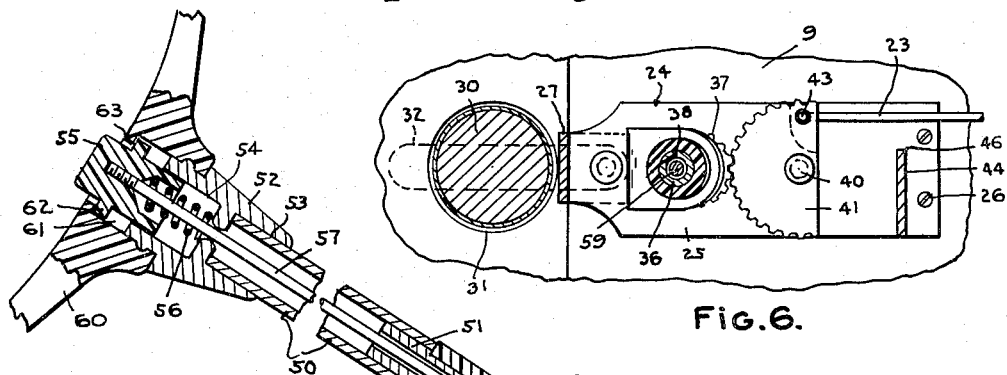

In the drawings:
FIGURE 1 is a top plan view of a device constructed in accordance with the invention,
FIGURE 2 is a side elevation thereof,
FIGURE 3 is a transverse section taken substantially on line 3—3 of FIGURE 2,
FIGURE 4 is a top plan view of a lower housing section showing steering and sound mechanism as fixedly connected with respect to the body,
FIGURE 5 is an enlarged fragmentary section taken substantially on line 5—5 of FIGURE 4, and
FIGURE 6 is a horizontal section taken substantially on line 6—6 of FIGURE 5.

Referring specifically to the drawings, the numeral 5 designates a miniature land vehicle, embodying a lower molded housing section 6 and an upper molded housing section 7. The sections 6 and 7 are assembled in their housing forming relation around the marginal portions of the housing frictionally by an overlapping engagement, as at 8. The housing section 7 may be molded into any desirable configuration, simulating a conventional land vehicle and in the illustration, representing a conventional "sports car."

Fixed to the flat bottom 6' of the housing section 6 and extending for the major length thereof, is a preferably wood block 9. The block 9 is secured to the flat bottom 6' by screws, or like fastening devices 10. Front steering wheels 11 are supported upon the forward end portion of the block 9 and are operative through openings 12 formed in the lower housing section. Rear ground wheels 13 are supported upon a cross shaft 14 and the shaft 14 has a rocking motion within an oppositely tapered slot 15 that extends transversely of the block 9 adjacent its rear end, thus permitting a rocking motion of the vehicle with respect to the rear ground wheels 13. The bottom 6' underlies the slot 15 and supports the shaft 13 against disengagement from the device. The wheels 13 operate in openings 16, formed in the rear portion of the housing section 6. The front wheels 11 are steered in a conventional manner, and includes yokes 17, pivotally connected at 18 to a cross bracket 19 that is fixed to the underside of the forward end of the block 9. The yokes 17 are each provided with steering arms 20, that are connected by a drag link 21. One yoke 17 is provided with an inwardly extending steering arm 22, that is connected to an elongated steering link 23. The steering mechanism is conventional and forms no important part of the present assembly of this invention.

Fixedly connected to the top of the block 9 at its rear portion, is a mounting bracket indicated as a whole by the numeral 24. The bracket 24 includes a horizontal plate 25, that is fixedly connected at one end to the block 9, by screws 26. The plate 25 at its rear extremity is provided with an integral right angle head portion 27. The head 27 is apertured to receive a fastening screw 28 that is engaged into the rear end portion of the block 9. The head 27 at its upper end is provided with a horizontally arranged right angle tongue 29, functioning as a contact stop for a conventional flashlight battery 30. The battery 30 is insertable through an aperture 31, formed in the lower housing 6 and is held in engagement with the tongue 29 by pivotally connected latch plate 32, that is pivotally connected to a forward extension 33 of the head 27, as at 34. The latch plate is frictionally held against accidental movement to underlie the negative side of the battery 30 and is relatively flexible so that the battery 30 is biased upwardly against the tongue 29.

Intermediate its length, the plate 25 is struck upwardly to form an angled bearing tongue 35. The tongue 35 is apertured to form a bearing for a tubular stem 36, preferably formed integral with a beveled pinion 37. The pinion 37 and its stem 36 is held in rotative engagement with respect to the tongue 35 by an elongated flexible tube 38. The stem 36 has a relatively tight engagement within the tube 38 whereby a rotation of the tube 38, imparts rotation to the pinion 37. The tube 38 extends upwardly through an aperture 39 of the upper housing section 7. Pivotally supported upon the plate 25, as at 40, is a segment gear 41. The segment gear 41 has constant meshing engagement with the pinion 37 and constitutes the steering means for the forward ground wheels 11. The segment gear 41 at one side is undercut, as indicated at 42 to receive the upturned end 43 of the steering rod 23. The cut away 42, forms a clearance for the rotative movement of the segment 41 with respect to the rod 23, since the rod 23 lies closely adjacent to the upper surface of the block 9 and is held against disengagement with respect to the segment gear by its overriding engagement with the block. The segment gear thus, is able to turn a maximum of 180 degrees, thus limiting the movement of the front ground wheels 11 to a steering ratio that will prevent any abrupt movement of the front wheels that would tend to probably upset the vehicle.

The plate 25 is provided with an upstanding arm 44, supporting an audible signal device 45. The arm 44 at one side, has been slotted or cut away at 46, to form a clearance for the swinging movement of the rod 23. Fixedly connected to the plate 25, rearwardly of the bearing tongue 35, is a pair of flexible contact elements 47. One contact element 47 is connected to the positive side of the battery, through a conductor 48, while the other contact 47 is connected to the audible signal device 45, through a medium of a conductor 49.

Means are provided to rotate the flexible tube 38 and to also energize the signal device 45, such means comprising a relatively non-flexible and preferably metallic tube 50. The tube 50, is preferably formed of aluminum and is frictionally coupled with the free end of the tube 38, by a metallic sleeve 51. The sleeve 51 has a preferably force fit into one end of the tube 50 while its opposite end is frictionally engaged into the opening of the tube 38 where it will be retarded in its rotative movement to such a degree that the rotation of the tube 50 will impart rotation to the tube 38 in a manner similar to a universal joint. The frictional engagement of the sleeve 51 into the tube 38 is such that, should the operator attempt to steer the device beyond its maximum limits, the sleeve will slip in the tube 38, avoiding any damage to the mechanism. The tube 50 at its upper end is preferably fixedly engaged into a tubular hub portion 52. The hub portion 52 recessed at 53 to receive the upper end of the tube 50, a second axially arranged recess 54 telescopically receives a signal button 55. The button is biased in an outward direction by a coil spring 56. Threaded into the button 55 axially thereof, is a signal actuating rod 57. The rod 57 extends throughout the length of the tube 50, the hub 52 and the sleeve 51 and its lower end is adapted to contact a head portion 58 of a flexible rod 59. The rod 59 extends downwardly through the tube 38, and through a tubular opening of the stem 36 and the pinnion 37, to project below the pinnion for contacting engagement with the uppermost contact strip 47. It will thus be apparent, that when the button 55 is pressed inwardly, the rod 57 also forces the flexible rod 59 downwardly, engaging the contact strips 47 and establishing a flow of energy from the battery 30 to the signal device 45. Connected with the hub 52, is a hand wheel 60. The hand wheel 60 has a snapping engagement with a reduced upper portion of the hub 52 to hold the hand wheel in frictional driving engagement with the hub 52 and also prevents disengagement of the hand wheel with respect to the hub. A recess 61 of the hand wheel 60, receives a collar 62, formed upon the button 55 and the recess is flanged at 63 to prevent disengagement of the button 55 with respect to the hand wheel and the hub 52 under the expansive influence of the spring 56. Since the tube 38 is formed of rubber or plastics, it may be flexed upwardly and downwardly, permitting the hand wheel 60 to be elevated or lowered in accordance with the height of the child operating the device and for storage and assembly purposes, the tube 50 and associated parts may be disconnected from the tube 38, since this connection is primarily a frictional coupling and greatly facilitates the packing or storing of the device for shipment.

In the use of the device, assuming the parts to be assembled in the manner illustrated, the operator grasps the wheel 60, forcing the vehicle 5 forwardly and by rotating the wheel 60, the segment gear 41 is rotated about its pivot 40 by the pinnion 37, actuating the rod 23 for steering the vehicle either to the right or to the left. Simultaneously, the operator may press upon the button 55 and through the medium of the rod 57, pressing upon the rod 59, closes the contact from the battery 30 to energize the audible signal 45. It is apparent therefore that the device is controlled in any position of elevation of the wheel 60 and throughout the steering motion, the signal device may be sounded. The battery 30 may be replaced by simply swinging the arm 32 laterally, permitting the battery 30 to drop downwardly, when a fresh battery may be installed. When the device is to be stored or shipped, the assembly of the wheel 60, the hub 52, the button 55, the tube 50 and the sleeve 51 are pulled away from the upper end of the tube 38, leaving the upper extended end of the tube 38 remaining in assembled relation that is disposed within the body. The parts are few, simple, cheap to manufacture, are strong, durable and is highly effective as a propelling and steering mechanism for miniature vehicles whereby a child may walk in the rear of the vehicle, propelling it along the floor and to simultaneously be able to actuate the audible signal.

It is to be understood that the invention is not limited to the precise construction shown, but that changes are contemplated as readily fall within the spirit of the invention as shall be determined by the scope of the subjoined claims.

Having described our invention, what we claim as new and desire to secure by Letters Patent is:

1. A miniature land vehicle of the character described that embodies a housing formed of upper and lower molded plastic sections, front and rear ground wheels for the mobile support of the vehicle, the front wheels being steerable and the rear wheels being rockable in a vertical plane, a base plate fiexdly connected to the lower housing section and that extends for the major length thereof, a bracket device mounted upon the base plate at its rear portion, that bracket device embodying a base plate having an upwardly angle tongue struck therefrom, the said bracket plate terminating rearwardly in an upstanding head, a pinion gear having a tubular stem portion that projects upwardly through an aperture formed in the tongue and whereby the aperture of the tongue forms a journal bearing for the stem and its associated pinion gear, a segment gear rotatably supported upon the bracket plate to have constant meshing engagement with the pinion, a steering rod connected with the segment gear and with the steering mechanism of the front wheels, a flexible tubular shaft that frictionally engages the stem whereby to hold the stem and the pinion gear with respect to the aperture of the tongue, the said flexible shaft projecting upwardly through an opening formed in the upper housing section, a rigid steering column having a frictional driving engagement with respect to the upper end of the flexible shaft, a hand wheel supported upon the steering column, an audible signal device supported upon the bracket and an electrical connector also supported upon the bracket plate and means extending through the pinion gear and the stem and that traverses the opening in the flexible shaft for its major length, the said means being flexible and shiftable downwardly to engage the circuit maker, a rigid rod supported within the steering column and that has contacting engagement at one end with the said means, the said rod at its opposite end being provided with a button whereby the rod is axially shifted to impart shifting action to the said means for actuating the circuit closer, the said button and the said rod being biased in one direction by spring means, an electrical battery that is insertable upwardly through an opening formed in the lower casing section and electrical conducting means between the battery, the circuit closer and the audible signal device, the said steering column being swingable in a vertical plane in accordance with the height of a child in a walking position, the said tubular shaft being rotatable under the influence of the steering column and the steering wheel whereby to actuate the pinion gear and the segment gear for imparting a steering action to the front wheels, the said tubular shaft being also bendable in a vertical plane to accommodate the steering wheel in accordance with the height of the child, the said means within the flexible shaft being also flexible and bendable with the flexible shaft.

2. A miniature vehicle of the character described having a body portion that is formed by upper and lower molded plastic sections that are connected together in a horizontal manner along their marginal edges, an elongated mounting block fixed upon the lower section and with the block extending throughout the major length of the housing, a pair of front ground wheels, means for steering the front wheels, a pair of rear ground wheels that are rotatable upon a common axle, the axle and the rear ground wheels being rockable with respect to the block in a vertical plane, an integrally formed bracket device having a base plate that is fixedly engaged upon the top of the block adjacent its rear end, the base plate being provided with a right angle head portion, the base plate being provided with an upwardly and rearwardly angled tongue, a pinion gear having a stem portion that is axially apertured and with the aperture extending through the gear, a segment gear rotatably supported upon the base plate to have a constant meshing engagement with the pinion gear, a steering rod connected to the segment gear at one side and that extends forwardly for actuating engagement with the steering mechanism of the front wheels whereby a rotation of the pinion gear and the segment gear actuates the steering rod to move the front wheels in opposite directions within a radius of 180 degrees, a flexible tubular shaft that has frictional engagement with the stem portion of the pinion gear whereby the pinion gear and the stem are rotatably supported within an aperture of the tongue, the said flexible shaft extending upwardly at an angle to project through an opening formed in the upper casing section, a tubular steering column, a tubular sleeve that has fixed engagement in the lower end of the column and that projects outwardly from the column to have a detachable frictional engagement within the upper end of the flexible shaft, a hub portion connected to the opposite end of the steering column for supporting a steering wheel, the said hub being recessed for the reception of an actuating button, a relatively rigid rod connected to the button and that extends through the column to terminate and be co-extensive with the said sleeve, a flexible rod disposed within the tubular shaft and having its upper end terminating adjacent to the lower end of the first named rod, the said flexible rod extending downwardly through the stem and the pinion gear, the said flexible rod being axially shiftable with respect to the flexible shaft under the influence of the button and its associated rod and whereby the flexible rod is projected downwardly below the said pinion gear, a circuit closer that is supported upon the base plate of the bracket and that underlies the said pinion gear in alignment with the flexible rod, an audible signal device that is supported upon the bracket and a source of electrical energy disposed within the housing and that is electrically connected through the circuit closer to the signal device and means for supporting the source of electrical energy with respect to the housing.

3. The structure according to claim 2 wherein the flexible shaft and the said flexible rod are formed of plastics whereby the flexible shaft and its associated rod may be flexed in a vertical plane and rotatable under the influence of the steering wheel for imparting a driving action to the pinion gear and the segment gear for steering the vehicle, the said flexible rod and the rigid rod being actuatable under the influence of the button to close the circuit maker.

4. The structure according to claim 2 wherein the source of electrical energy includes a dry cell battery, the battery being insertible through a lower opening of the lower casing section, the said head of the bracket being provided with a right angle tongue portion at its upper end to receive and form a contact for the positive electrode of the battery, the said battery being removably supported within the housing and in contacting engagement with the contact of the head by a laterally swingable tongue that is pivotally supported upon the bracket and that swings to and from an underlying engagement with respect to the negative side of the battery, the said electrical connector comprising a pair of spring tongues that is supported upon the base plate to be insulated from each other.

References Cited in the file of this patent

UNITED STATES PATENTS

| 1,808,015 | Wollaston | June 2, 1931 |
| 2,161,971 | Muller | June 13, 1939 |